(12) United States Patent
Taranta et al.

(10) Patent No.: US 11,297,832 B2
(45) Date of Patent: Apr. 12, 2022

(54) AGROCHEMICAL GRANULES MADE OF POLYALKOXYLATE, DISPERSANT, SUGAR, AND POLYVINYLPYRROLIDONE

(71) Applicant: BASF SE, Ludwigshafen am Rhein (DE)

(72) Inventors: Claude Taranta, Stutensee (DE); Thomas Bork, Westhofen (DE); Hans-Michael Fricke, Limburgerhof (DE); Thorsten Mattil, Hassloch (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/551,811

(22) PCT Filed: Feb. 10, 2016

(86) PCT No.: PCT/EP2016/052755
§ 371 (c)(1),
(2) Date: Aug. 17, 2017

(87) PCT Pub. No.: WO2016/131683
PCT Pub. Date: Aug. 25, 2016

(65) Prior Publication Data
US 2017/0360031 A1    Dec. 21, 2017

(30) Foreign Application Priority Data
Feb. 20, 2015 (EP) ..................... 15155862

(51) Int. Cl.
| | |
|---|---|
| *A01N 25/14* | (2006.01) |
| *A01N 53/00* | (2006.01) |
| *A01N 25/30* | (2006.01) |
| *A01N 43/36* | (2006.01) |
| *A01P 7/02* | (2006.01) |
| *A01P 7/04* | (2006.01) |
| *A01N 25/04* | (2006.01) |
| *A01N 43/20* | (2006.01) |

(52) U.S. Cl.
CPC ............. *A01N 25/14* (2013.01); *A01N 25/04* (2013.01); *A01N 25/30* (2013.01); *A01N 43/20* (2013.01); *A01N 43/36* (2013.01); *A01N 53/00* (2013.01); *A01P 7/02* (2021.08); *A01P 7/04* (2021.08)

(58) Field of Classification Search
CPC ........ A01N 25/14; A01N 43/20; A01N 25/04; A01N 53/00; A01N 25/30; A01N 43/36; A01N 51/00; A01P 7/02; A01P 7/04; Y10S 514/919
See application file for complete search history.

(56) References Cited

U.S. PATENT DOCUMENTS

| | | |
|---|---|---|
| 2002/0039968 A1 | 4/2002 | Aven et al. |
| 2006/0003898 A1 | 1/2006 | Devisetty et al. |
| 2007/0054805 A1 | 3/2007 | Krause et al. |
| 2007/0081947 A1 | 4/2007 | Eble et al. |
| 2010/0278890 A1 | 11/2010 | Winowiski |
| 2012/0157312 A1 | 6/2012 | Krapp et al. |
| 2013/0109725 A1 | 5/2013 | Dave et al. |

FOREIGN PATENT DOCUMENTS

| | | |
|---|---|---|
| CN | 1040728 A | 3/1990 |
| CN | 102919222 A | 2/2013 |
| CN | 102939975 B | 3/2014 |
| EP | 0274851 B1 | 7/1992 |
| JP | H03-255001 A | 11/1991 |
| WO | PCT-2013/087417 A1 | 6/2013 |
| WO | PCT-2013/127790 A2 | 9/2013 |
| WO | 2014133178 A1 | 9/2014 |

OTHER PUBLICATIONS

Extended European Search Report for EP Patent Application No. 15155862.4, dated May 7, 2015, 7 pages.
International Preliminary Reporton Patentability for PCT Patent Application No. PCT/EP2016/052755, dated May 2, 2017, 8 pages.
International Search Report and Written Opinion for PCT Patent Application No. PCT/EP2016/052755, dated Apr. 22, 2016, 13 pages.

*Primary Examiner* — John Pak
*Assistant Examiner* — Andriae M Holt
(74) *Attorney, Agent, or Firm* — Armstrong Teasdale LLP

(57) ABSTRACT

A granular composition comprising a pesticide, 0.1 to 10 wt % of a nonionic amphiphilic polyalkoxylate, at least 20 wt % of a solid water-soluble anionic dispersant, at least 5 wt % of a sugar, which is a mono- or disaccharide, or a mixture thereof, and a polyvinylpyrrolidone is provided. Methods for the preparation of the granular composition including the steps of (i) providing an aqueous suspension comprising the pesticide, the polyalkoxylate, the dispersant and the sugar, (ii) drying the aqueous suspension, and (iii) granulating the aqueous or dried suspension, and wherein the polyvinylpyrrolidone is added in step (i) and/or step (iii) are further provided. Methods for controlling at least one of phytopathogenic fungi, plant growth, attack by insects or mites, and/or for regulating the growth of plants, wherein the composition is allowed to act on the particular pests, their habitat, the undesired or useful plants, and/or the soil are further provided.

16 Claims, No Drawings

AGROCHEMICAL GRANULES MADE OF POLYALKOXYLATE, DISPERSANT, SUGAR, AND POLYVINYLPYRROLIDONE

CROSS-REFERENCE TO RELATED APPLICATIONS

This application is a U.S. National Phase Application of PCT/EP2016/052755, filed Feb. 10, 2016, which claims the benefit of priority to European Patent Application No. 15155862.4, filed Feb. 20, 2015, the entire contents of which are hereby incorporated by reference herein.

BACKGROUND

The present invention relates to a granular composition comprising a pesticide, up to 10 wt % of a nonionic amphiphilic polyalkoxylate, at least 20 wt % of a solid water-soluble anionic dispersant, at least 5 wt % of a water-soluble sugar, and a polyvinylpyrrolidone. It further relates to a method for the preparation of the granular composition comprising the steps of (i) providing an aqueous suspension comprising the pesticide, the polyalkoxylate, the dispersant and the sugar, (ii) optionally drying the aqueous suspension, and (iii) granulating the aqueous suspension or the dried aqueous suspension, and wherein the polyvinylpyrrolidone is added in step (i) and/or step (iii). It further relates to a method for controlling phytopathogenic fungi and/or undesired plant growth and/or undesired attack by insects or mites and/or for regulating the growth of plants, where the composition is allowed to act on the particular pests, their habitat or the plants to be protected from the particular pest, the soil and/or on undesired plants and/or the useful plants and/or their habitat. The present invention comprises combinations of preferred features with other preferred features.

Agrochemical granular compositions comprising a pesticide are known. They have various disadvantages: The granular composition dissolves or disperses very slowly upon mixing with water, e.g. for preparing an aqueous tank mix. The composition allows only for a low loading of the pesticide. The granular composition dissolves or disperses upon mixing with water including the forming of large particles, which results in clogging of the spray nozzles when applying the aqueous tank mix. Object of the present invention was to overcome said disadvantages.

DETAILED DESCRIPTION

The object was achieved by a granular composition comprising
a) a pesticide,
b) 0.1 to 10 wt % of a nonionic amphiphilic polyalkoxylate,
c) at least 20 wt % of a solid water-soluble anionic dispersant,
d) at least 5 wt % of a sugar, which is a mono- or disaccharide, or a mixture thereof, and
e) a polyvinylpyrrolidone.

The composition may be a solid composition at ambient temperature. The composition comprises at least 80 wt %, preferably at least 90, and in particular at least 95 wt % granules. The granules may have a particle size distribution of D50 from 0.05 to 10 mm, preferably from 0.1 to 5 mm. The granules may have a particle size distribution of D90 from 0.1 to 15 mm, preferably from 0.3 to 7 mm.

The term pesticides refers to at least one active substance selected from the group of the fungicides, insecticides, nematicides, herbicides, safeners, biopesticides and/or growth regulators. Preferred pesticides are fungicides, insecticides, herbicides and growth regulators. Especially preferred pesticides are insecticides. Mixtures of pesticides of two or more of the abovementioned classes may also be used. The skilled worker is familiar with such pesticides, which can be found, for example, in the Pesticide Manual, 17th Ed. (2015), The British Crop Protection Council, London. Suitable insecticides are insecticides from the class of the carbamates, organophosphates, organochlorine insecticides, phenylpyrazoles, pyrethroids, neonicotinoids, spinosins, avermectins, milbemycins, juvenile hormone analogs, alkyl halides, organotin compounds nereistoxin analogs, benzoylureas, diacylhydrazines, METI acarizides, and insecticides such as chloropicrin, pymetrozin, flonicamid, clofentezin, hexythiazox, etoxazole, diafenthiuron, propargite, tetradifon, chlorofenapyr, DNOC, buprofezine, cyromazine, amitraz, hydramethylnon, acequinocyl, fluacrypyrim, rotenone, or their derivatives. Suitable fungicides are fungicides from the classes of dinitroanilines, allylamines, anilinopyrimidines, antibiotics, aromatic hydrocarbons, benzenesulfonamides, benzimidazoles, benzisothiazoles, benzophenones, benzothiadiazoles, benzotriazines, benzyl carbamates, carbamates, carboxamides, carboxylic acid diamides, chloronitriles cyanoacetamide oximes, cyanoimidazoles, cyclopropanecarboxamides, dicarboximides, dihydrodioxazines, dinitrophenyl crotonates, dithiocarbamates, dithiolanes, ethylphosphonates, ethylaminothiazolecarboxamides, guanidines, hydroxy-(2-amino)pyrimidines, hydroxyanilides, imidazoles, imidazolinones, inorganic substances, isobenzofuranones, methoxyacrylates, methoxycarbamates, morpholines, N-phenylcarbamates, oxazolidinediones, oximinoacetates, oximinoacetamides, peptidylpyrimidine nucleosides, phenylacetamides, phenylamides, phenylpyrroles, phenylureas, phosphonates, phosphorothiolates, phthalamic acids, phthalimides, piperazines, piperidines, propionamides, pyridazinones, pyridines, pyridinylmethylbenzamides, pyrimidinamines, pyrimidines, pyrimidinonehydrazones, pyrroloquinolinones, quinazolinones, quinolines, quinones, sulfamides, sulfamoyltriazoles, thiazolecarboxamides, thiocarbamates, thiophanates, thiophenecarboxamides, toluamides, triphenyltin compounds, triazines, triazoles. Suitable herbicides are herbicides from the classes of the acetamides, amides, aryloxyphenoxypropionates, benzamides, benzofuran, benzoic acids, benzothiadiazinones, bipyridylium, carbamates, chloroacetamides, chlorocarboxylic acids, cyclohexanediones, dinitroanilines, dinitrophenol, diphenyl ether, glycines, imidazolinones, isoxazoles, isoxazolidinones, nitriles, N-phenylphthalimides, oxadiazoles, oxazolidinediones, oxyacetamides, phenoxycarboxylic acids, phenylcarbamates, phenylpyrazoles, phenylpyrazolines, phenylpyridazines, phosphinic acids, phosphoroamidates, phosphorodithioates, phthalamates, pyrazoles, pyridazinones, pyridines, pyridinecarboxylic acids, pyridinecarboxamides, pyrimidinediones, pyrimidinyl(thio)benzoates, quinolinecarboxylic acids, semicarbazones, sulfonylaminocarbonyltriazolinones, sulfonylureas, tetrazolinones, thiadiazoles, thiocarbamates, triazines, triazinones, triazoles, triazolinones, triazolocarboxamides, triazolopyrimidines, triketones, uracils, ureas.

The pesticide may be water soluble or water insoluble. Mixtures of water soluble pesticide and a water insoluble pesticide are also possible.

The pesticide may have a melting point of at least 30° C., preferably at least 40° C. and in particular of at least 50° C.

The composition may contain from 5 to 70 wt %, preferably from 15 to 50 wt %, and in particular from 20 to 40 wt % of the pesticide.

Suitable nonionic amphiphilic polyalkoxylate are free of ionic groups. The polyalkoxylate is amphiphilic, which usually means that is has surfactant properties and lowers the surface tension of water. Usually, the polyalkoxylate is obtainable by alkoxylation using alkyleneoxides, such as $C_2$-$C_6$-alkylene oxide, preferably ethylene oxide, propylene oxide, or butylene oxide. Examples of polyalkoxylates are block polymers or compounds such as alcohols, alkylphenols, amines, amides, arylphenols, fatty acids or fatty acid esters which have been alkoxylated with 1 to 50 equivalents.

The polyalkoxylate may have a melting point of at least 35° C., preferably at least 43° C., more preferably at least 48° C. and in particular at least 50° C.

The polyalkoxylate is usually soluble in water at 20° C., and e.g. at pH 7. Preferably, the solubility in water of the polyalkoxylate is at least 3 wt %, more preferably at least 7 wt %, and in particular at least 10 wt %.

The molecular weight of the polyalkoxylate is usually in the range of from 0.5 to 50 kDa, preferably from 2 to 35 kDa, and in particular from 5 to 20 kDa.

The polyalkoxylate is preferably a block polymer, which may contain a hydrophilic block and a hydrophobic block. Suitable block polymers are block polymers of the A-B or A-B-A type comprising blocks of polyethylene oxide and polypropylene oxide, or of the A-B-C type comprising alkanol, polyethylene oxide and polypropylene oxide.

Preferably, the polyalkoxylate is a block polymer comprising at least one polyethoxylate block and at least one poly-$C_3$-$C_5$-alkoxylate block (e.g. polypropoxylate or polybutoxylate).

In particular, the polyalkoxylate is a triblock polymer of A-B-A type comprising a polyethoxylate type A block and a poly-$C_3$-$C_5$-alkoxylate block (preferably polypropoxylate) type B block.

The composition comprises up to 10 wt %, preferably up to 8 wt %, and in particular up to 7 wt % of the polyalkoxylate. In another form the composition may comprise 0.1 to 10 wt %, preferably 0.5 to 8 wt %, and in particular 2 to 7 wt % of the polyalkoxylate.

The composition comprises a solid water-soluble dispersant. The dispersant is usually solid at 25° C., or it may have a melting point of at least 30° C., preferably at least 50° C., and in particular at least 100° C. The dispersant is soluble in water, e.g. at least 50 g/l, preferably at least 100 g/l, each at 20° C., and e.g. at pH 7.

Suitable dispersants are alkali, alkaline earth or ammonium salts of sulfonates, sulfates, phosphates, carboxylates, and mixtures thereof. Examples of sulfonates are sulfonated phenolformaldehyde condensation products, sulfonated cresol-formaldehyde condensation products, alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates. Preferably, the dispersant comprises a sulfonated and/or sulfated aryl-formaldehyde condensation products, or a mixture thereof.

In one form the dispersant is a sulfonate, such as sulfonated phenol-formaldehyde condensation products, sulfonated cresol-formaldehyde condensation products, alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates; or the dispersant is a sulfate, such as sulfates of fatty acids and oils, of ethoxylated alkylphenols, of alcohols, of ethoxylated alcohols, or of fatty acid esters.

Preferred dispersant are alkali, alkaline earth or ammonium salts of sulfonates or sulfates, more preferably sulfonated and/or sulfated aryl-formaldehyde condensation products, such as alkali salts of sulfonated and/or sulfated phenol-formaldehyde condensation products (e.g. CAS 102980-04-1), sulfonated and/or sulfated naphthalene-formaldehyde condensation products (e.g. CAS 9084-06-4), and/or sulfonated and/or sulfated cresol-formaldehyde condensation products (e.g. CAS 115535-44-9). Typically the sulfates or sulfonates have a molecular weight from 200 to 2000 g/mol, preferably from 250 to 1000 g/mol.

In another form the dispersant is a mixture of at least two sulfonates, e.g. selected from sulfonated aryl-formaldehyde condensation products or a mixture thereof, more preferably selected from alkali, alkaline earth or ammonium salts of sulfonates or sulfates, such as alkali salts of sulfonated and/or sulfated phenol-formaldehyde condensation products (e.g. CAS 102980-04-1), sulfonated and/or sulfated naphthalene-formaldehyde condensation products (e.g. CAS 9084-06-4), and/or sulfonated and/or sulfated cresol-formaldehyde condensation products (e.g. CAS 115535-44-9).

The composition comprises at least 20 wt %, preferably at least 30 wt %, and in particular at least 35 wt % of the dispersant. In another form the composition may comprise 20 to 70 wt %, preferably 25 to 60 wt %, and in particular 30 to 50 wt % of the dispersant.

In one form the composition comprises a water-soluble sugar. The sugar is preferably soluble in water, e.g. at least 5 g/l, preferably at least 50 g/l, and in particular at least 100 g/l each at 20° C., e.g. at pH 7.

The sugar is typically a mono- or disaccharide, or a mixture thereof. Suitable sugars are mono- or disaccharides (e.g. lactose, fructose, saccharose, maltose, glucose), especially disaccharides, such as lactose. Mixtures of sugars are also possible. More preferred sugars are lactose, fructose, saccharose, maltose, glucose, or mixtures thereof.

The composition comprises at least 5 wt %, preferably at least 10 wt %, and in particular at least 15 wt % of the sugar. In another form the composition may comprise 5 to 50 wt %, preferably 10 to 40 wt %, and in particular 15 to 35 wt % of the sugar. In another form the amount of sugar is used to fill up all other components of the composition to 100 wt %.

The composition comprises a polyvinylpyrrolidone. The polyvinylpyrrolidone may be water-soluble, e.g. at least 3 wt %, preferably at least 7 wt %, and in particular at least 10 wt %, usually at 20° C., and e.g. at pH 7. The polyvinylpyrrolidone may be solid at 25° C.

Suitable polyvinylpyrrolidone are homopolymers of vinylpyrrolidone, copolymers of vinylpyrrolidone, which comprise at least 80 mol % of vinylpyrrolidone (based on the total amount of monomers in the copolymer), or mixtures thereof. The polyvinylpyrrolidone is preferably a homopolymer of vinylpyrrolidone.

The composition comprises up to 15 wt %, preferably up to 10 wt %, and in particular up to 5 wt % of the polyvinylpyrrolidone. In another form the composition may comprise 0.1 to 10 wt %, preferably 0.1 to 7 wt %, and in particular 0.5 to 4 wt % of the polyvinylpyrrolidone.

The composition may comprise a solid wetting agent, preferably an anionic solid wetting agent, such as alkali, alkaline earth or ammonium salts of the anionic wetting agent. The wetting agent is usually solid at 20° C. Mixtures of wetting agents are also possible.

Suitable wetting agents are naphthalenesulfonate (e.g. disodium salt of methylene dinaphtalene suphonate, sodium naphatalene sulphonate formaldehyde condensate, ammonium naphatalene sulphonate formaldehyde condensate), alkylnaphthalenesulfonate (e.g. sodium alkyl naphtalene sulphonate), benzenesulfonate, alkylbenzenesulfonate (e.g. sodium cumene sulphonate, potassium cumene sulphonate, sodium xylene sulphonate, sodium toluene sulphonate), alkanesulfonate (e.g. sodium tetradecene sulphonate), alpha-olefin sulfonate (e.g. sodium alpha olefin sulphonate), sulfosuccinate (e.g. sodium dioctyl sulphosuccinate), alkyl phosphate (e.g. Lauryl myristyl phosphate), alkyl sulfate (e.g. sodium lauryl sulphate, sodium cetyl stearyl sulphate, sodium cetyl sulphate, sodium myristyl sulphate, sodium cetyl stearyl sulphate), and mixtures thereof.

Further examples are lactylates (e.g. calcium stearoyl lactylate, sodium stearoyl lactylate), glutamates (e.g. sodium N-Stearoyl-L glutamate), isethonates (e.g. sodium cocoyl isethionate, isethionic acid sodium salt), fatty acid methyl taurate sodium salt (e.g. sodium N-methyl-N-oleyltaurate), sarcosinates (e.g. sodium N-lauroyl sarcosinate, sodium N-miristoyl sarcosinate, sodium N-palmitoyl sarcosinate), sulphoacetates (e.g. sodium lauryl sulphoacetate, disodium lauryl sulphhosuccinate), alkyl methyl tauride, sodium methyl cocoyl laurate, or mixtures thereof.

Preferred wetting agent is alkyl sulfate, more preferably $C_{8-18}$ alkyl sulfate, such as dodecyl sulfate.

The composition comprises up to 10 wt %, preferably up to 5 wt %, and in particular up to 4 wt % of the wetting agent. In another form the composition may comprise 0.1 to 10 wt %, preferably 0.5 to 5 wt %, and in particular 0.7 to 3.5 wt % of the wetting agent, such as the alkyl sulfate.

Usually, the composition is essentially free of an organic solvent, e.g. it comprises less than 5 wt %, preferably less than 2 wt %, and in particular less than 0.2 wt % organic solvent.

Usually, the composition is essentially free of water, e.g. it comprises less than 5 wt %, preferably less than 2 wt %, and in particular less than 0.5 wt % water.

The composition may comprise auxiliaries. Examples for suitable auxiliaries are solubilizers, protective colloids, adhesion agents, thickeners, humectants, repellents, attractants, feeding stimulants, compatibilizers, bactericides, anti-freezing agents, anti-foaming agents, colorants, tackifiers and binders.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

In one form the composition comprises
a) 10 to 60 wt % of the pesticide,
b) 0.1 to 10 wt % of the polyalkoxylate (e.g. where the polyalkoxylate is a block polymer comprising a polyethoxylate block and a poly-C3-C5-alkoxylate block),
c) 20 to 70 wt % of the dispersant (e.g. a sulfonated and/or sulfated aryl-formaldehyde condensation products, or a mixture thereof),
d) 5 to 50 wt % of the sugar (e.g. selected from mono- or disaccharides, or mixtures thereof),
e) 0.1 to 10 wt % of the polyvinylpyrrolidone (e.g. selected from homopolymers of vinylpyrrolidone, copolymers of vinylpyrrolidone, which comprise at least 80 mol % of vinylpyrrolidone (based on the total amount of monomers in the copolymer), or mixtures thereof),
f) and optionally 0.1 to 10 wt % of the wetting agent (e.g. selected from naphthalenesulfonate, alkylnaphthalenesulfonate, benzenesulfonate, alkylbenzenesulfonate, alkanesulfonate, alpha-olefin sulfonate, sulfosuccinate, alkyl phosphate, alkyl sulfate, and mixtures thereof),
wherein the amounts of a) to f) sum up to 80 to 100 wt % of the composition.

In another form the composition comprises
a) 15 to 50 wt % of the pesticide,
b) 0.5 to 8 wt % of the polyalkoxylate (e.g. where the polyalkoxylate is a block polymer comprising a polyethoxylate block and a poly-C3-C5-alkoxylate block),
c) 25 to 60 wt % of the dispersant (e.g. a sulfonated and/or sulfated aryl-formaldehyde condensation products, or a mixture thereof),
d) 10 to 40 wt % of the sugar (e.g. selected from mono- or disaccharides, or mixtures thereof),
e) 0.1 to 7 wt % of the polyvinylpyrrolidone (e.g. selected from homopolymers of vinylpyrrolidone, copolymers of vinylpyrrolidone, which comprise at least 80 mol % of vinylpyrrolidone (based on the total amount of monomers in the copolymer), or mixtures thereof),
f) and optionally 0.5 to 5 wt % of the wetting agent (e.g. selected from naphthalenesulfonate, alkylnaphthalenesulfonate, benzenesulfonate, alkylbenzenesulfonate, alkanesulfonate, alpha-olefin sulfonate, sulfosuccinate, alkyl phosphate, alkyl sulfate, and mixtures thereof),
wherein the amounts of a) to f) sum up to 80 to 100 wt % of the composition.

In another form the composition comprises
a) 20 to 40 wt % of the pesticide,
b) 2 to 7 wt % of the polyalkoxylate (e.g. where the polyalkoxylate is a block polymer comprising a polyethoxylate block and a poly-C3-C5-alkoxylate block),
c) 30 to 50 wt % of the dispersant (e.g. a sulfonated and/or sulfated aryl-formaldehyde condensation products, or a mixture thereof),
d) 10 to 35 wt % of the sugar (e.g. selected from mono- or disaccharides, or mixtures thereof),
e) 0.5 to 4 wt % of the polyvinylpyrrolidone (e.g. selected from homopolymers of vinylpyrrolidone, copolymers of vinylpyrrolidone, which comprise at least 80 mol % of vinylpyrrolidone (based on the total amount of monomers in the copolymer), or mixtures thereof),
f) and optionally 0.7 to 3.5 wt % of the wetting agent (e.g. selected from naphthalenesulfonate, alkylnaphthalenesulfonate, benzenesulfonate, alkylbenzenesulfonate, alkanesulfonate, alpha-olefin sulfonate, sulfosuccinate, alkyl phosphate, alkyl sulfate, and mixtures thereof), wherein the amounts of a) to f) sum up to 80 to 100 wt % of the composition.

The present invention further relates to a method for the preparation of the granular composition, where the composition comprises
a) the pesticide,
b) 0.1 to 10 wt % of the nonionic amphiphilic polyalkoxylate,
c) at least 20 wt % of the solid water-soluble anionic dispersant,
d) at least 5 wt % of the sugar, which is a mono- or disaccharide, or a mixture thereof, and
e) the polyvinylpyrrolidone,
comprising the steps of
(i) providing an aqueous suspension comprising the pesticide, the polyalkoxylate, the dispersant and the sugar,
(ii) optionally drying the aqueous suspension, and
(iii) granulating the aqueous suspension or the dried aqueous suspension, and
wherein the polyvinylpyrrolidone is added in step (i) and/or step (iii).

The polyvinylpyrrolidone is preferably added in step (i).

The aqueous suspension may contain at least 20 wt %, preferably at least 30 wt % and in particular at least 40 wt % water. The aqueous suspension may contain up to 60 wt %, preferably at least 50 wt % and in particular up to 40 wt % water.

The aqueous suspension usually contains the pesticide in form of suspended particles. The aqueous suspension may contain at least 20 wt %, preferably at least 30 wt % and in particular at least 40 wt % of the pesticide. The aqueous suspension may contain up to 60 wt %, preferably at least 50 wt % and in particular up to 40 wt % of the pesticide.

In step (ii) the drying may be done by heating (e.g. from 30 to 100° C.) and/or applying reduced pressure.

In step (iii) the granulation may be done by any known granulation technology, such as pan or drum granulation, mixing agglomeration, extrusion granulation, fluid bed granulation, tabletting, or spray drying granulation. G. A. Bell and D. A. Knowles in, "Chemistry and Technology of Agrochemical Formulations," D. A. Knowles, editor, (Kluwer Academic Publishers, 1998), pages 41-114, describe the types of granules used in agricultural chemical formulations and provide many references to the production.

The granulation in step (iii) is preferably made by spray granulation of the aqueous suspension. More preferably, the granulation in step (iii) is made by spray granulation of the aqueous suspension, wherein the polyvinylpyrrolidone is added in step (i).

The invention further relates to a method for controlling phytopathogenic fungi and/or undesired plant growth and/or undesired attack by insects or mites and/or for regulating the growth of plants, where the composition is allowed to act on the particular pests, their habitat or the plants to be protected from the particular pest, the soil and/or on undesired plants and/or the useful plants and/or their habitat.

When employed in plant protection, the amounts of pesticide applied are, depending on the kind of effect desired, from 0.001 to 2 kg per ha, preferably from 0.005 to 2 kg per ha, more preferably from 0.05 to 0.9 kg per ha, in particular from 0.1 to 0.75 kg per ha.

Various types of oils, wetters, adjuvants, fertilizer, or micronutrients, and other pesticides (e.g. herbicides, insecticides, fungicides, growth regulators, safeners) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

The user applies the composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

The composition and the methods according to the invention offer various advantages: The granular composition dissolves or disperses very fast upon mixing with water, e.g. for preparing an aqueous tank mix. The composition allows for a high loading of the pesticide, even in case of mixtures various ratio of the pesticides. Various granulation technologies (such as spray drying, fluidized bed, pan granulation, extrusion) may be used for preparing the composition, thanks to easy and flexible redistribution of the inert ingredients in the manufacturing process. The granular composition dissolves or disperses upon mixing with water without forming large particles, which is very helpful to avoid clogging of the spray nozzles when applying the aqueous tank mix. A high pesticide loading allows also for a low water dilution required for aerial spray applications. The granular composition is storage stable; it has a high suspensibility in water even after storage; it has a low sedimentation after suspension even after storage; the suspended pesticide particles do hardly increase in size even after storage. The composition has a high tank mix compatibility with other agrochemical formulations.

The examples which follow illustrate the invention without imposing any limitation.

EXAMPLES

Polyalkoxylate: EO-PO-EO triblockpolymer, Molecular weight 10-15 kDa, containing 70-75 wt % EO; >10 wt % water-soluble, melting point about 55° C.

Lactose: lactose monohydrate

Stabilizer: aliphatic carboxylic acid, soluble in water (>5 wt %)

Dispersant 1: phenolsulfonic acid-formaldehyde-polycondensate, sodium salt, powder, melting point above 150° C., solubility in water above 100 g/l at 20° C.

Dispersant 2: naphthalenesulfonic acid-formaldehyde-polycondensate, sodium salt, powder, melting point above 150° C., solubility in water above 100 g/l at 20° C.

Wetter: Dodecyl sulfate, sodium salt, powder, melting point above 200° C., solubility in water 150 g/l at 20° C.

Carrier: Polyvinylpyrrolidone, homopolymer, powder, K value (1% in water) about 30, solubility in water above 20 wt %.

Defoamer: Silicon based defoamer.

Pesticide A: Mixture of 50/50 wt % chlorfenapyr and water-insoluble pesticide (solubility below 0.1 g/l), melting point above 60° C.

Example 1

Granules were prepared having the final composition as in Table 1 by a laboratory scale procedure and by an upscaled procedure as follows:

A) Laboratory Scale Procedure:

A liquid suspension concentrate premix was wet milled, then thin layer dried, manually crushed down, used a bed to fill fluidized bed granulator chamber on which some water or solution of the Carrier was sprayed to form granules. Here the dried wet milled material was fully used as a solid bed.

B) Upscaled Procedure:

A liquid suspension concentrate premix was wet milled, then thin layer dried, manually crushed down, a small part of it (up to 15%) was used as nuclei to fill the spray drying granulator chamber on which the liquid wet milled premix (85%) was sprayed to form granules. Here the dried wet milled material was partially used as nuclei, but not as bed. For larger upscaling the wet milled premix can also be directly spray dried and form granules without the nuclei.

TABLE 1

Composition of granules (all data in wt %)

| | |
|---|---|
| Pesticide A | 30 |
| Polyalkoxylate | 5 |
| Stabilizer | 1 |
| Wetter | 2 |
| Dispersant 1 | 20 |
| Dispersant 2 | 20 |
| Defoamer | 2 |
| Carrier | 2 |
| Lactose | 20 |

Example 2

The granules comprising the components of Table 2 were prepared as described in Example 1.

TABLE 2

Composition of granules (all data in wt %)

| | A | B | C |
|---|---|---|---|
| Alpha-cypermethrin | 5 | 22 | 7 |
| Dinotefuran | 20 | 14 | 28 |
| Polyalkoxylate | 5 | 10 | 10 |
| Stabilizer | 1 | 1 | 1 |
| Wetter | 2 | 1 | 1 |
| Dispersant 1 | 20 | 20 | 20 |
| Dispersant 2 | 20 | 20 | 20 |
| Defoamer | 2 | 2 | 2 |
| Carrier | 2 | 1 | 1 |
| Lactose | 25 | 9 | 10 |

Example 3—Stability of Actives and of Granules

Samples of the granules prepared in Example 1 and 2 were stored for two weeks at 54° C. The content both actives was determined initially and at the end. No degradation of the actives was found. The granules remained free flowable.

Example 4—Particle Size

Samples of the granules prepared in Example 2A were stored for two weeks at 54° C. and then dispersed in water. The particle size distribution of the aqueous suspension was determined with a Malvern Mastersizer and summarized in Table 3. The line "Initial" lists values for granules without storage for two weeks at 54° C.

TABLE 3

| | D50 | D90 |
|---|---|---|
| Initial | 2.1 µm | 6.6 µm |
| 2 weeks at 54° C. | 1.9 µm | 6.1 µm |

Example 5—Sedimentation

Samples of the granules prepared in Example 2A and 2B were stored for two weeks at 54° C. The granules were suspended in standard hard water at a concentration of 1 wt %. The suspensions were allowed to stand for 30 or 120 min, respectively, at room temperature in a graduated tap cylinder and the volume of sediment was analyzed (Table 4).

TABLE 4

| | Sediment [ml] After 30 min | Sediment [ml] After 120 min |
|---|---|---|
| Ex. 2 A Initial | 0.02 | 0.02 |
| Ex. 2 A Stored | 0.01 | 0.02 |
| Ex. 2 B Initial | <0.01 | 0.02 |
| Ex. 2 B Stored | 0.01 | 0.02 |

Example 6—Suspensibility

Samples of the granules prepared in Example 2 were stored for two weeks at 54° C. The granules were suspended in standard hard water at a concentration of 1 wt %. The suspensions were allowed to stand for two h at room temperature. Ninety percent of the suspension were withdrawn and the water removed by drying. The dried residue was weighted and the percentage of suspended material calculated (Table 5).

TABLE 5

| | Suspensibility [%] |
|---|---|
| Initial | 100 |
| Ex. 2 A | 99 |
| Ex. 2 B | 99 |
| Ex. 2 C | 99 |

The invention claimed is:

1. A granular composition comprising:
   a) 20 to 40 wt. % of a mixture of pesticides comprising alpha-cypermethrin and dinotefuran;
   b) 0.1 to 10 wt. % of a nonionic amphiphilic polyalkoxylate comprising a triblock polymer of A-B-A type comprising a polyethoxylated type A block and a poly-($C_3$-$C_5$)-alkoxylate type B block;
   c) 20 to 50 wt. % of a solid water-soluble anionic dispersant, wherein the dispersant comprises sulfonated and/or sulfated aryl-formaldehyde condensation products or mixtures thereof;
   d) 5 to 35 wt. % of a sugar selected from the group consisting of lactose, saccharose, maltose, and mixtures thereof;
   e) 0.5 to 4 wt. % of a polyvinylpyrrolidone;
   f) a stabilizer;
   g) a defoamer; and h) 0.1 to 5 wt. % of a solid anionic wetting agent selected from the group consisting of alkanesulfonate, alpha-olefin sulfonate, alkyl sulfate, alkali, alkaline earth or ammonium salt of alkyl sulfate, and mixtures thereof; and wherein the granular composition comprises less than 2 wt. % of organic solvent.

2. The composition according to claim 1, wherein the wetting agent is selected from the group consisting of alkanesulfonate, alpha-olefin sulfonate, alkyl sulfate, and mixtures thereof.

3. The composition according to claim 1, wherein the dispersant comprises sulfonated and/or sulfated phenol-formaldehyde condensation products, sulfonated and/or sulfated cresol-formaldehyde condensation products, sulfonated and/or sulfated naphthalene-formaldehyde condensation products, or mixtures thereof.

4. The composition according to claim 1, wherein the dispersant is a mixture of sulfonated and/or sulfated aryl-formaldehyde condensation products.

5. The composition according to claim 1, wherein the polyvinylpyrrolidone is selected from homopolymers of vinylpyrrolidone, copolymers of vinylpyrrolidone, which comprise at least 80 mol % of vinylpyrrolidone, based on the total amount of monomers in the copolymer or mixtures thereof.

6. The composition according to claim 1, wherein the dispersant is soluble in water at least 50 g/l.

7. The composition according to claim 1, wherein the nonionic amphiphilic polyalkoxylate is present from 2 wt. % to 7 wt. %, the dispersant is present from 30 wt. % to 50 wt. %, the sugar is present from 15 wt. % to 35 wt. % and the anionic wetting agent is present from 0.7 wt. % to 3.5 wt. %.

8. The composition according to claim 1, wherein the nonionic amphiphilic polyalkoxylate is present from 2 wt. % to 7 wt. %, the poly-($C_3$-$C_5$)-alkoxylate type B block comprises a polypropoxylate; the dispersant is present from 30 wt. % to 50 wt. % and comprises a mixture of phenolsulfonic acid-formaldehyde-polycondensate, sodium salt and naphthalenesulfonic acid-formaldehyde-polycondensate, sodium salt; the sugar is lactose and is present from 15 wt. % to 35 wt. %; and the anionic wetting agent is dodecyl sulfate and is present from 0.7 wt. % to 3.5 wt. %.

9. The composition according to claim 1, wherein the nonionic amphiphilic polyalkoxylate is present from 2 wt. % to 7 wt. %, the poly-($C_3$-$C_5$)-alkoxylate type B block comprises a polypropoxylate; the dispersant is present from 30 wt. % to 50 wt. % and comprises a mixture of phenolsulfonic acid-formaldehyde-polycondensate, sodium salt and naphthalenesulfonic acid-formaldehyde-polycondensate, sodium salt; the sugar is lactose and is present from 15 wt. % to 35 wt. %; the stabilizer comprises an aliphatic carboxylic acid; the defoamer comprises silicone; and the anionic wetting agent is dodecyl sulfate and is present from 0.7 wt. % to 3.5 wt. %.

10. A method for the preparation of a granular composition, wherein the composition comprises:
a) 20 to 40 wt. % of a mixture of pesticides comprising alpha-cypermethrin and dinotefuran;
b) 0.1 wt. % to 10 wt. % of a nonionic amphiphilic polyalkoxylate comprising a triblock polymer of A-B-A type comprising a polyethoxylated type A block and a poly-(C3-C5)-alkoxylate type B block;
c) 20 wt. % to 50 wt. % of a solid water-soluble anionic dispersant, wherein the dispersant comprises sulfonated and/or sulfated aryl-formaldehyde condensation products or mixtures thereof;
d) 5 wt. % to 35 wt. % of a sugar selected from the group consisting of lactose, saccharose, maltose, and mixtures thereof;
e) 0.5 to 4 wt. % of a polyvinylpyrrolidone;
f) a stabilizer;
g) a defoamer; and
h) 0.1 to 5 wt. % of a solid anionic wetting agent selected from the group consisting of alkanesulfonate, alpha-olefin sulfonate, alkyl sulfate, alkali, alkaline earth or ammonium salt of alkyl sulfate, and mixtures thereof; and comprising the steps of:
(i) providing an aqueous suspension comprising the pesticide, the polyalkoxylate, the dispersant, the sugar, the wetting agent and the antifoaming agent;
(ii) drying the aqueous suspension; and
(iii) granulating the aqueous suspension or the dried aqueous suspension and wherein the polyvinylpyrrolidone is added in step (i) and/or step (iii).

11. The method according to claim 10, wherein the granulating is made by spray granulation of the aqueous suspension, and wherein the polyvinylpyrrolidone is added in step (i).

12. The method of claim 10, wherein the polyvinylpyrrolidone is added in steps (i) and (iii).

13. The method according to claim 10, wherein the nonionic amphiphilic polyalkoxylate is present from 2 wt. % to 7 wt. %, the dispersant is present from 30 wt. % to 50 wt. %, the sugar is present from 15 wt. % to 35 wt. % and the anionic wetting agent is present from 0.7 wt. % to 3.5 wt. % and wherein the anionic wetting agent is added in step (i).

14. The method according to claim 10, wherein the nonionic amphiphilic polyalkoxylate is present from 2 wt. % to 7 wt. %, the poly-($C_3$-$C_5$)-alkoxylate type B block comprises a polypropoxylate; the dispersant is present from 30 wt. % to 50 wt. % and comprises a mixture of phenolsulfonic acid-formaldehyde-polycondensate, sodium salt and naphthalenesulfonic acid-formaldehyde-polycondensate, sodium salt; the sugar is lactose and is present from 15 wt. % to 35 wt. %; and the anionic wetting agent is dodecyl sulfate and is present from 0.7 wt. % to 3.5 wt. % and wherein the anionic wetting agent is added in step (i).

15. The method according to claim 10, wherein the nonionic amphiphilic polyalkoxylate is present from 2 wt. % to 7 wt. %, the poly-($C_3$-$C_5$)-alkoxylate type B block comprises a polypropoxylate; the dispersant is present from 30 wt. % to 50 wt. % and comprises a mixture of phenolsulfonic acid-formaldehyde-polycondensate, sodium salt and naphthalenesulfonic acid-formaldehyde-polycondensate, sodium salt; the sugar is lactose and is present from 15 wt. % to 35 wt. %; the stabilizer comprises an aliphatic carboxylic acid; the defoamer comprises silicone; and the anionic wetting agent is dodecyl sulfate and is present from 0.7 wt. % to 3.5 wt. % and wherein the anionic wetting agent is added in step (i) and the polyvinylpyrrolidone is added in step (iii).

16. A method for controlling undesired attack by insects or mites, where the composition as defined in claim 1 is allowed to act on the insects or mites, and/or their habitat or the plants to be protected from the insects or mites.

* * * * *